United States Patent [19]

Hauser

[11] Patent Number: 4,667,792
[45] Date of Patent: May 26, 1987

[54] FLUID FRICTION CLUTCH

[75] Inventor: Kurt Hauser, Stuttgart, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 657,125

[22] Filed: Oct. 3, 1984

[30] Foreign Application Priority Data

Oct. 6, 1983 [DE] Fed. Rep. of Germany ....... 3336380

[51] Int. Cl.⁴ .................. F16D 35/00; F16D 43/25
[52] U.S. Cl. .................... 192/58 B; 192/82 T
[58] Field of Search ................ 192/58 B, 82 T, 58 A

[56] References Cited

U.S. PATENT DOCUMENTS

| 3,648,811 | 3/1972 | La Flame ................ 192/58 B |
| 3,688,884 | 9/1972 | Perrin et al. ............ 192/58 B |
| 3,893,555 | 7/1975 | Elmer .................... 192/58 B |
| 4,004,668 | 1/1977 | Blair ....................... 192/58 |
| 4,007,819 | 2/1977 | Maci ....................... 192/58 |
| 4,090,596 | 5/1978 | Blair ..................... 192/58 B |
| 4,116,317 | 9/1978 | Streeter ................. 192/58 B |
| 4,281,750 | 8/1981 | Clancey ................. 192/58 B |
| 4,282,960 | 8/1981 | Glasson et al. ......... 192/82 T |
| 4,351,426 | 9/1982 | Bopp ..................... 192/82 T |
| 4,432,444 | 2/1984 | Hauser .................... 192/58 |
| 4,437,554 | 3/1984 | Haeck .................... 192/58 B |
| 4,446,952 | 5/1984 | Masai ..................... 192/58 B |
| 4,502,580 | 3/1985 | Clancey ................. 192/82 T |
| 4,555,004 | 11/1985 | Nakamura et al. ..... 192/58 B |
| 4,570,771 | 2/1986 | Yamaguchi et al. .... 192/82 T |

FOREIGN PATENT DOCUMENTS 1137271 9/1962 Fed. Rep. of Germany.
2130568 12/1972 Fed. Rep. of Germany.

*Primary Examiner*—Rodney H. Bonck
*Attorney, Agent, or Firm*—Schwartz, Jeffery, Schwaab, Mack, Blumenthal & Evans

[57] ABSTRACT

Disclosed is a fluid friction clutch having front and rear working gaps, which are connected to one another in a manner which provides more continuous and uniform distribution of the torque-transmitting viscous medium between the gaps. The clutch includes at least one bore through the drive disk which separates the front and rear working gaps. The bore is positioned in annular grooves which are provided in the drive disk at the same radial distance as the bore and which further include baffles positioned in the grooves to block the flow of fluid around the annular grooves and to promote flow through the bore. A similar groove/baffle arrangement is provided as a return means on the rear side of the drive disk near to the outer periphery.

13 Claims, 5 Drawing Figures

FIG. 1
FIG. 2
FIG. 3
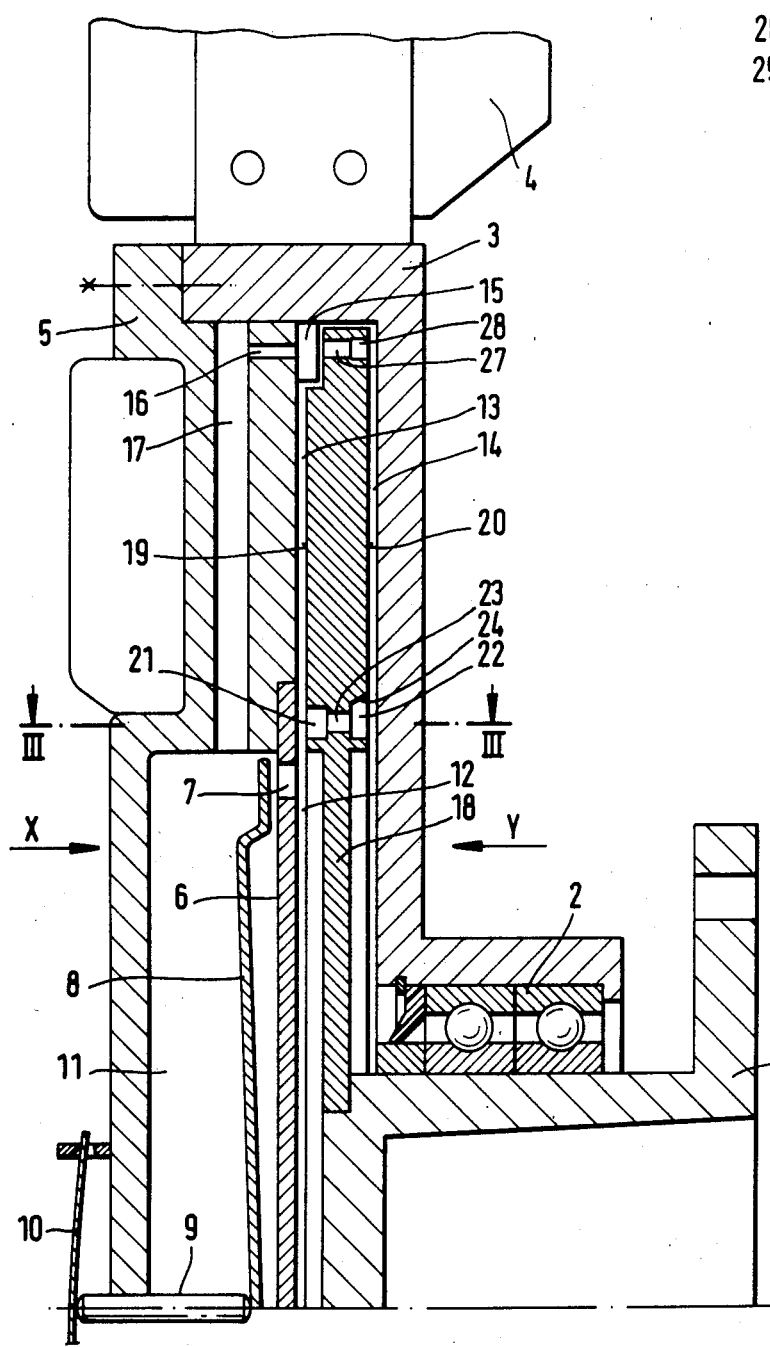
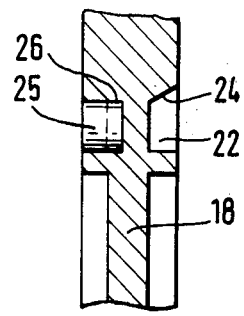
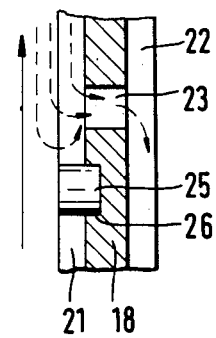

FLUID FRICTION CLUTCH

BACKGROUND OF THE INVENTION

The present invention relates to a fluid friction clutch.

A fluid friction clutch of a type similar to that of the present invention is described, for example, in Applicant's German Offenlegungsschrift No. 30 09 665. A clutch of this type transfers a torque force by means of the fluid friction of a viscous medium located in the working gaps of the clutch. The working gaps, which are located between the drive disk and the clutch housing, are provided both on the front and the rear side of the drive disk, and a valve opening for supplying the viscous medium which is present in front of the drive disk. However, in clutches of this design, conditions for the supply of the viscous medium to the front and the rear working gap are different, thus frequently resulting in the rear working gap being inadequately filled with the viscous medium or being filled in an uncontrolled manner. This leads to undesirable torque or rpm fluctuations, i.e., the control behavior of such a clutch is unsatisfactory, because no defined correlation or functional dependence exists between the output speed of the clutch and the temperature which functions as the control parameter.

In the clutch described in German Offenlegungsschrift No. 30 09 665, the drive disk includes a plurality of radially extending elongated holes arranged around the periphery of the drive disk in the area of the working gap, which permit passage of the viscous medium from the front to the rear side of the drive disk. In other clutch configurations, for example, according to German Auslegeschrift No. 11 37 271, passage bore holes are provided in a radial arrangement on the drive disk within the working gap. In another configuration according to German Offenlegungsschrift No. 26 37 694, so-called pump grooves are provided to improve the circulation of the viscous medium, so that the rear working gap may be more adequately filled. Finally, another solution to the present problem is described in German Offenlegungsschrift No. 26 23 570, wherein, in addition to the valve opening in the partition wall, an overflow orifice is provided through which the viscous medium continuously flows into the work chamber. However, none of the measures mentioned above results in a satisfactory solution to the problem.

Finally, a fluid friction clutch with scoop filling control is known, by German Offenlegungsschrift No. 21 30 568, wherein the viscous medium passes from a control chamber into the work chamber through a plurality of radially and tangentially offset bores in a partition wall. The primary disk of this clutch also comprises a plurality of radially and tangentially offset transverse bores through which the viscous medium passes from the front side to the rear side of the disk. The filling and emptying of the work chamber is effected by means of a pure transverse flow through the same bores, since the work chamber and the control chamber act as communicating vessels. There is, therefore, no circulation through an inlet and an outlet orifice, resulting in different inflow and outflow conditions.

SUMMARY OF THE INVENTION

It is therefore an object of the present invention to provide a fluid friction clutch having improved fluid flow conditions to and from the working gaps on both the front and rear sides of the drive disk.

A more specific object is to provide a fluid friction clutch which exhibits improved fluid flow conditions of the viscous medium to the working gaps on both the front and rear sides of the drive disk and from the rear working gap to the viscous medium reservoir.

Another object is the provision of a fluid friction clutch which exhibits improved control behavior of the clutch so as to attain stable intermediate rotational speeds.

Therefore, in accordance with one aspect of the present invention, there has been provided a fluid friction clutch, comprising a drive member; a rotatably supported housing comprising a work chamber, a reservoir and a partition separating the work chamber and the reservoir; a temperature-controlled valve and a return means connecting the work chamber and the reservoir through which a torque-transmitting viscous medium passes during circulation between the work chamber and the reservoir; a drive disk mounted on the drive member so as to revolve in the work chamber and to define, with the housing, front and rear working gaps; at least one first bore extending from the front to the back of a radially inward portion of the drive disk connecting the front and rear working gaps for passing a portion of the viscous medium through the bore under pressure from the front working gap to the rear working gap; and at least one first baffle on the drive disk positioned in the front working gap with respect to the first bore so as to induce the aforesaid passage of viscous medium through the bore. Preferably, the drive disk further comprises a first annular groove arranged coaxially on the side of the drive disk next to the front working gap and is positioned radially in the region of the first bore. In a still more preferred embodiment, the baffle is positioned in the annular groove and is offset in the circumferential direction from the first bore.

In a further embodiment of the present invention, the drive disk is provided with a second annular groove which is arranged coaxially on the rear side of the drive disk and is positioned radially in the region of the bore. Also, it is desirable to provide the drive disk on its rear side with a still further annular groove in the radially outward portion of the disk and a further baffle.

Further objects, features and advantages of the present invention will become apparent from the detailed description of preferred embodiments which follows, when considered together with the figures of drawing.

BRIEF DESCRIPTION OF THE DRAWING

In the drawings:

FIG. 1 is an axial cross-sectional view of the fluid friction clutch of the invention taken along line I—I of FIG. 4;

FIG. 2 is a partial axial sectional view through the inner baffle taken along line II—II of FIG. 4;

FIG. 3 is a partial sectional view taken along the circumferential section line III—III of FIG. 4, projected into the plane;

DETAILED DESCRIPTION OF PREFERRED EMBODIMENTS

Figure 4:
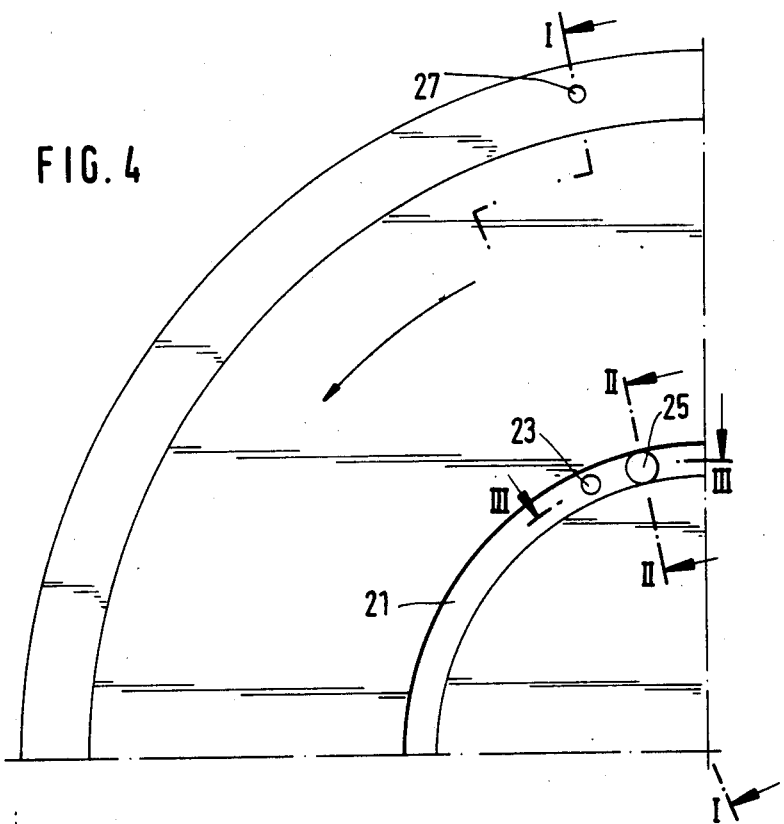
FIG. 4 is a partial radial sectional (quarter circle section) with a view in the X direction.

According to the present invention, the fluid friction clutch which includes a drive disk having an overflow orifice in combination with a baffle design results in a controlled supply of a viscous medium from the front to the rear working gap, which is better and more uniformly filled. The baffle, which can be selected from any known design and which functions as an obstacle, is secured to the drive disk, offset in the circumferential direction adjacent to the overflow orifice, thereby effecting a transverse flow of the viscous medium to the rear side of the drive disk. The arrangement of additional radially inwardly and outwardly positioned pumping elements in the drive disk makes it possible to compensate for the unequal inflow and outflow conditions for the front and rear sides of the drive disk and to assure a uniform and equal inflow and outflow of the viscous medium on both sides of the drive disk.

In the advantageous further embodiment of the invention, an annular groove is provided on the front side of the drive disk in the radial area of the overflow orifice, the cross section of which is filled by the baffle. As a result of this design, the viscous medium can collect initially in the circumferential annular groove, which is advantageous since such collection aids in providing controlled, uniform inflow of the viscous medium.

According to another embodiment, a further annular groove is provided on the rear side of the drive disk, so as to communicate through the overflow orifice with the annular groove on the front side or the front working gap. This assures that the viscous medium exiting from the overflow orifice can collect initially in the rear annular groove, prior to entering the rear working gap. This measure again improves the inflow conditions to the rear working gap and thus the control behavior of the clutch.

Preferably the annular grooves have a rectangular cross section. This is especially advantageous for the front annular groove when it is provided with a cylindrical baffle. More preferably, the cross section of the rear annular groove is in the shape of a trapezoid, with the outer wall widening conically in the direction of the rear working gap. This measure results in the viscous medium collecting in the rear annular groove, and thus entering the rear working gap more uniformly and with fewer losses.

According to still another embodiment, the drive disk is provided in the radially outer area of its rear side with an additional overflow orifice in combination with a further baffle. This results in an improvement in the outflow conditions of the viscous medium from the rear working gap. The viscous medium is thus pumped to the radially outer area from the working gap, in a manner similar to its entry in the radially inner area into the rear working gap, and thus directly in the area of a return device. The return device comprises a baffle fastened to the clutch housing and corresponding return bore holes. This measure again contributes to the improved control behavior of the clutch.

The provision of an additional annular groove on the rear side of the drive disk in the area of the outer baffle, similar to the arrangement on the front side of the drive disk, results in better viscous medium collection and more effective pumping of the viscous medium from the rear working gap.

FIG. 1 illustrates a fluid friction clutch according to the present invention in its fundamental configuration. In this configuration, the clutch is used, in particular, to drive a fan which moves a flow of cooling air through a radiator in an internal combustion engine of an automotive vehicle. The clutch is driven, either directly or indirectly, by means of a drive member 1 of the internal combustion engine. A fan 4 is attached to the clutch housing 3, which is rotatably supported, with respect to the drive member 1 by the bearing 2. The fan, which is not shown in detail, has the configuration of an axial fan. The clutch housing 3 is closed on the front side by a cover 5 and is divided by an internal partition 6 into a reservoir 11 and a work chamber 12, with a valve opening 7 being located in the partition 6. The valve opening 7 is opened and closed by a valve lever 8. The valve opening 7 and lever 8 are controlled as a function of temperature, i.e., by means of a bimetal element 10 arranged on the front side of the clutch assembly. The temperature dependent curvature of the bimetal element 10 is transferred by an actuating pin 9 to the valve lever 8. The valve lever 8 is fastened to the partition 6 in the conventional manner, which is not shown in detail. In addition to the valve opening 7, the work chamber 12 is also connected with the reservoir 11 by means of a return device. In a known manner, a baffle 15 is arranged on the clutch housing 3, in the vicinity of an axial return bore 16, which communicates with the reservoir 11 through the radial return bore 17. A drive disk 18 rotates in the work chamber 12. The drive disk is fixedly joined for rotation with the drive member 1 and forms a front working gap 13 and a rear working gap 14 with the clutch housing 3, wherein the front working surface 19 and the rear working surface 20 are plane parallel to the drive disk 18, as are the opposing working surfaces of the clutch housing 3. In the radially inside area of the two working gaps 13 and 14, i.e., in the inlet area, an overflow orifice 23 is provided in the drive disk 18 in the form of a bore. A circumferential annular groove 21, having the same radial position with respect to the axis of rotation of the clutch as the bore 23, is machined into the front side 19 of the drive disk 18. A further annular groove 22 is machined in a similar manner into the rear side 20 of the drive disk 18, again with a radial position corresponding to that of the bore 23 with respect to the axis of rotation of the clutch. The annular grooves 21 and 22 are thus connected by means of the transverse bore 23.

As may be seen, in particular in FIGS. 2, 3 and 4, a cylindrical baffle 25 is arranged, offset in the circumferential direction with respect to the bore 23, in the annular groove 21. The baffle 25 completely fills the rectangular cross section of the annular groove 21. The cylindrical baffle 25 is fixedly pressed into a corresponding receiving bore 26 in the drive disk 18 and terminates flush with the front working surfaces 19 of the drive disk 18.

Figure 5:
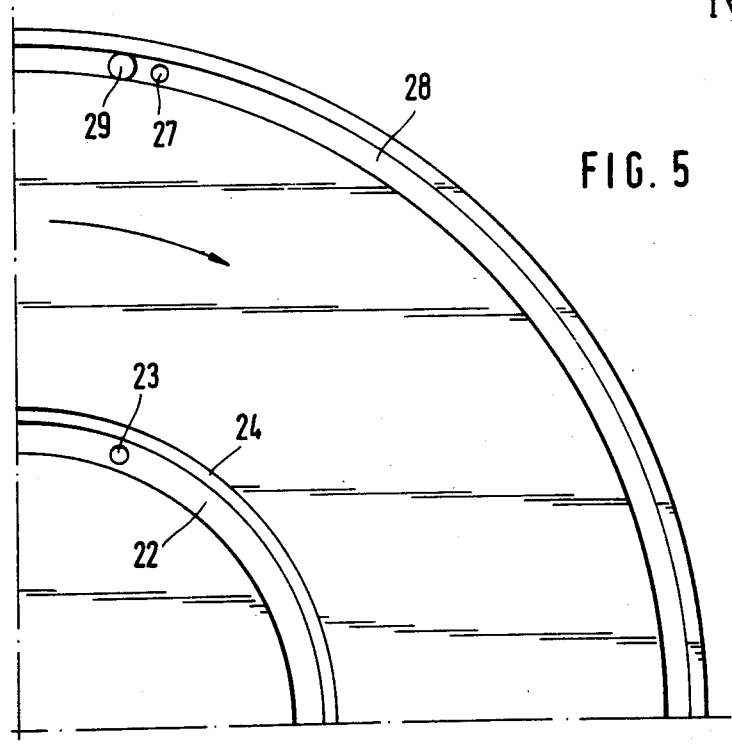
FIG. 5 is a partial radial section (quarter circle section) with a view in the Y direction.

FIG. 5 illustrates a further baffle 29 (arranged in a manner similar to the baffle 25 in the annular groove 21) in the radially outward annular groove 28 along the periphery of working surface 20 of the drive disk 18. Offset from the baffle 29 in the circumferential direction, a further overflow orifice 27 is provided in the form of a bore. The bore is positioned on approximately the same radius, with respect to the axis of rotation of the clutch, as the baffle 15 and the axial return bore 16.

The mode of operation of the fluid friction clutch is as follows. As the result of the temperature induced curvature of the bimetal element 10, the position of the valve lever 8 above the actuating pin 9 is altered. When the valve opening 7 is not blocked by the valve lever 8, viscous medium flows from the reservoir 11 into work chamber 12 under the effect of the centrifugal force generated by the rotation of the clutch housing 3, i.e., initially it flows into the front working gap 13, wherein a partial flow branches off and collects in the annular groove 21.

By the rotary action of the drive disk 18, the viscous medium is compressed in the area of the bore 23 by the baffle 25 and, as particularly shown in FIG. 3, is transported by dynamic pressure through the bore 23 to the rear side of the drive disk 18, where the viscous medium initially collects in the rear annular groove 22. From the rear annular groove 22, the viscous medium moves relatively easily, and in a uniform distribution around the circumference, over the incline 24 to the rear working gap 14. To improve the conditions of the flow of the viscous medium into the rear working gap 14, several bores 23 may be arranged over the circumference, in connection with corresponding baffles 25. Following the entry, in a uniform circumferential distribution, of the viscous medium into the front working gap 13 and the rear working gap 14, the viscous medium flows under the effect of centrifugal force radially outwardly and is transported from the fron working gap 13 by the conventional return device 15, 16, 17, back into the reservoir 11. The viscous medium flowing in the radially outward direction in the rear working gap 14 arrives in the radially outward annular groove 28, wherein it can collect, to be subsequently transported by pressure under the action of the baffle 29 through the bore 27, to the front side of the drive disk 18, in the area of the baffle 15. There, the two fluid streams from the front and the rear working gaps are combined and pumped together back into the reservoir 11.

What is claimed is:

1. A fluid friction clutch, comprising:
   a drive member;
   a housing rotatably supported on said drive member and comprising a work chamber, a reservoir and a partition separating said work chamber and said reservoir;
   a temperature-controlled valve and a return means connecting said work chamber and said reservoir, through which a torque-transmitting viscous medium passes in circulation between said work chamber and said reservoir;
   a drive disk mounted on said drive member, said disk revolving in said work chamber and forming, with said housing, front and rear working gaps, wherein said working gaps are adapted to be at least partially filled with said viscous medium;
   at least one first bore extending from the front to the back of a radially inward portion of said drive disk connecting said front and rear working gaps; and
   at least one first baffle on said drive disk, positioned in said front working gap and being offset circumferentially behind said first bore in the direction of revolution so as to induce a portion of said viscous medium entering via said valve through said bore under pressure from said front working gap in response to disk revolution to said rear working gap.

2. A fluid friction clutch as claimed in claim 1, further comprising a first annular groove inset into said drive disk and arranged coaxially on the side of said drive disk next to said front working gap and positioned radially in the region of said first bore so that said first bore is positioned in said first annular groove.

3. A fluid friction clutch as claimed in claim 2, wherein said first baffle is positioned in said first annular groove and substantially fills the cross-section thereof.

4. A fluid friction clutch as claimed in claim 3, wherein said baffle is circumferentially offset from said first bore in said first annular groove.

5. A fluid friction clutch as claimed in claim 2, further comprising a second annular groove arranged coaxially on the side of said drive disk next to said rear working gap and positioned radially in the region of said first bore.

6. A fluid friction clutch as claimed in claim 5, wherein said first and second annular grooves comprise a rectangular cross-section.

7. A fluid friction clutch as claimed in claim 5, wherein the radially outward diameter of said second annular grove increases in the direction toward said rear working gap.

8. A fluid friction clutch as claimed in claim 1, further comprising at least one second bore extending from the front to the back of a radially outward peripheral portion of said drive disk, wherein said second bore is positioned in proximity to said return means.

9. A fluid friction clutch as claimed in claim 8, further comprising a third annular groove arranged coaxially on the side of said drive disk next to said rear working gap and positioned radially in the region of said second bore.

10. A fluid friction clutch as claimed in claim 9, further comprising at least one second baffle circumferentially offset from said second bore in said third annular groove.

11. A fluid friction clutch as claimed in claim 10, wherein said second baffle substantially fills the cross-section of said third annular groove.

12. A fluid friction clutch as claimed in claim 11, wherein said first and second baffles comprise a cylindrical cross-section.

13. A fluid friction clutch as claimed in claim 1, wherein said first bore is located radially outwardly of said temperature-controlled valve.

* * * * *